US00RE34930E

United States Patent [19]

Kusz

[11] E Patent Number: Re. 34,930

[45] Reissued Date of Patent: May 9, 1995

[54] CHILD RESISTANT REMINDER CLOSURE

[75] Inventor: Maximillian Kusz, Waterville, Ohio

[73] Assignee: Owens Illinois Closure Inc., Toledo, Ohio

[21] Appl. No.: 83,818

[22] Filed: Jun. 28, 1993

Related U.S. Patent Documents

Reissue of:

[64] Patent No.: 5,184,739
Issued: Feb. 9, 1993
Appl. No.: 878,647
Filed: May 5, 1992

[51] Int. Cl.[6] ..... B65D 55/02

[52] U.S. Cl. ..... 215/220; 215/230; 206/534; 116/308

[58] Field of Search ..... 215/219, 220, 230; 206/534; 116/308

[56] References Cited

U.S. PATENT DOCUMENTS

| | | | |
|---|---|---|---|
| 3,151,599 | 10/1964 | Livingston | 116/308 |
| 4,011,829 | 3/1977 | Wachsmann et al. | 206/534 X |
| 4,220,247 | 9/1980 | Kramer | 116/308 X |
| 4,353,474 | 10/1982 | Luker . | |
| 4,365,722 | 12/1982 | Kramer | 215/220 |
| 4,371,088 | 2/1983 | Gach . | |
| 4,480,759 | 11/1984 | Behrens et al. . | |
| 4,609,114 | 9/1986 | Roy . | |
| 4,749,093 | 6/1988 | Trick | 215/220 |
| 4,957,210 | 9/1990 | Kusz . | |
| 5,009,338 | 4/1991 | Barker | 215/230 |
| 5,020,681 | 6/1991 | Kusz . | |

FOREIGN PATENT DOCUMENTS 1529999 10/1978 United Kingdom .

*Primary Examiner*—Allan N. Shoap
*Assistant Examiner*—Nova Stucker

[57] ABSTRACT

A child resistant reminder closure comprising an outer closure member having a base wall and a peripheral skirt, an inner closure member having a base wall and peripheral skirt with a bead on the outer closure member retaining the inner closure member against limited axial outward movement relative to the outer closure member. An assembly of a day disk and an indexing disk is provided in the outer closure member and is rotatable relative thereto. A first set of flexible radial ratcheting fingers extend radially from the day disk and engage radial lugs on the undersurface of the base wall of the outer closure member. A second set of flexible radial ratcheting fingers extend radially from the day disk and engage circumferentially spaced lugs on the upper surface of the indexing disk. Axially interengageable lugs and recesses are provided on the outer closure member and the indexing disk and interengaging lugs and recesses are provided between the indexing disk and inner closure member which are interengaged to remove the closure or to apply the closure to s container thereby providing a child resistant feature. A window is provided on the outer closure member and is associated with indicia on the day disk to indicate the circumferential position of the outer closure member relative to the day disk.

9 Claims, 7 Drawing Sheets

CHILD RESISTANT REMINDER CLOSURE

Matter enclosed in heavy brackets [ ] appears in the original patent but forms no part of this reissue specification; matter printed in italics indicates the additions made by reissue.

This invention relates to child resistant reminder closures.

BACKGROUND AND SUMMARY OF THE INVENTION

Regular use or maintenance of prescription drugs has become important in ensuring the health of users thereof and is being stressed and advocated by health authorities and governmental agencies such as the United States Food and Drug Administration. To comply with a regimen, it is helpful to remember when the person taking the medication last took the medication. One way of helping in this regard is to have a closure with a visual indicator of when the closure package was last opened or when the package should be opened next.

Current compliance closures use expensive battery operated indicators. Others use mechanical constructions that are complex and costly.

Typical closures of the mechanical type are shown in U.S. Pat. Nos. 3,151,599, 4,011,829, 4,365,722 and 5,009,338. Such closures have the disadvantage that they require axial movement between the reminder components. The axial movement between an outer closure member and an inner closure member to a child resistant closure would not permit such normal axial movement between the components or such reminder closures. In addition, relative axial movement and rotation between the reminder components can cause wear and obliteration of the indicia.

Among the objectives of the present invention are to provide a child resistant reminder closure of the mechanical type which is reliable; which functions to repeatedly provide the desired information; which do not incorporate axial forces between the reminder components; wherein the components are reversible so that the change in visible indicia can be made either on application or removal of the closure; which utilizes old and well known child resistant construction; and which can be manufactured readily in high-production.

In accordance with the invention, a child resistant reminder closure comprising an outer closure member having a base wall and a peripheral skin, an inner closure member having a base wall and a peripheral skin with a bead on the outer closure member retaining the inner closure member against limited axial outward movement relative to the outer closure member. An assembly of a day disk and an indexing disk is provided on the outer closure member and is rotatable relative thereto. The day disk is provided adjacent the inner surface of the base wall of the outer closure member and is mounted on the underlying indexing disk. A first set of flexible radial ratcheting fingers extend radially from the day disk and engage radial lugs on the undersurface of the base wall of the outer closure member. A second set of flexible radial ratcheting fingers extend radially from the day disk and engage circumferentially spaced lugs on the upper surface of the indexing disk. Axially interengageable lugs and recesses are provided on the outer closure member and the indexing disk and interengaging lugs and recesses are provided between the underside of the indexing disk and the inner closure member which are adapted to be engaged to remove or apply the closure from a container thereby providing a child resistant feature. A window is provided on the outer closure member and is associated with indicia on the day disk to indicate the circumferential position or the outer closure member relative to the day disk.

DESCRIPTION

Figure 1:
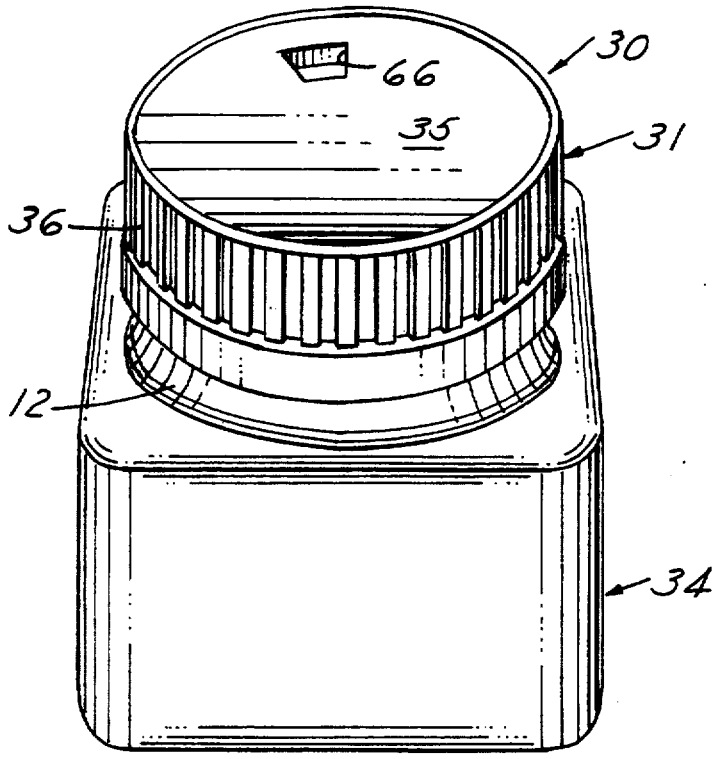
FIG. 1 is a perspective view of a child resistant package with a reminder closure.
Figure 2:
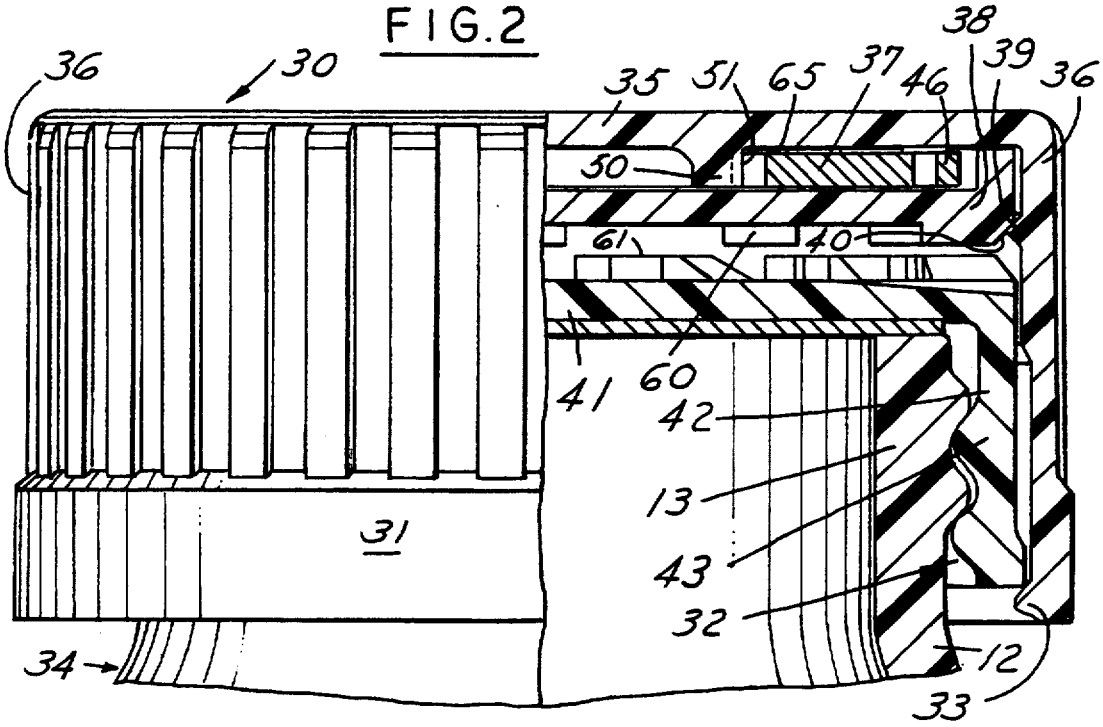
FIG. 2 is a part sectional view on a greatly enlarged scale showing the closure.

Referring to FIGS. 1 and 2, in accordance with the invention, the child resistant reminder closure 30 comprises an outer closure member 31 and an inner closure member 32 retained against limited axially outer movement by an annular bead 33. The closure 30 is adapted to be used with a container 34 having threads adapted to be engaged with the threads of the closure 30 as presently described.

Figure 3:
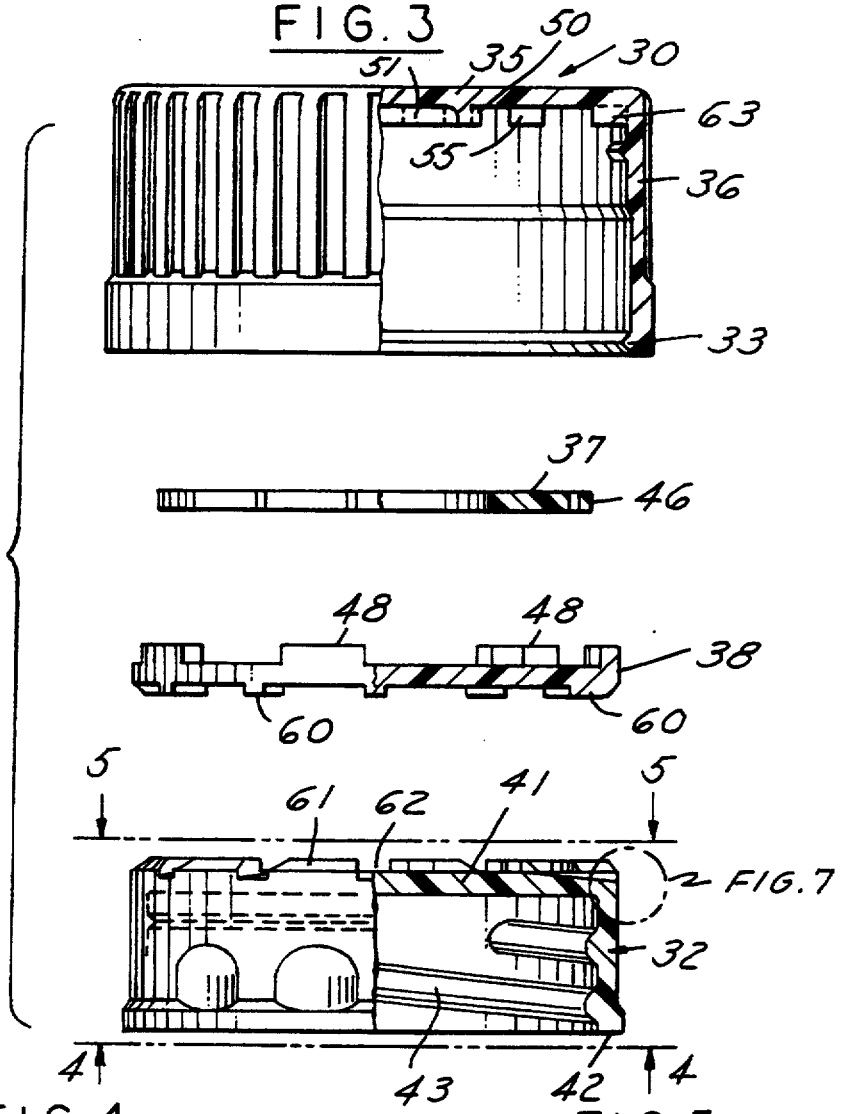
FIG. 3 is a part sectional exploded view of the closure.
Figure 4:
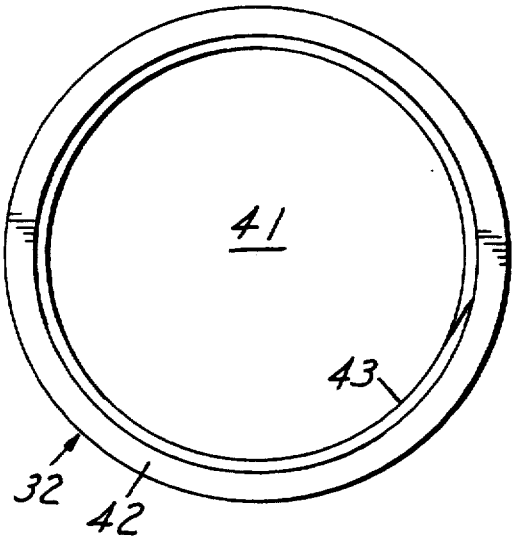
FIG. 4 is a bottom plan view taken along the line 4—4 in FIG. 3.
Figure 5:
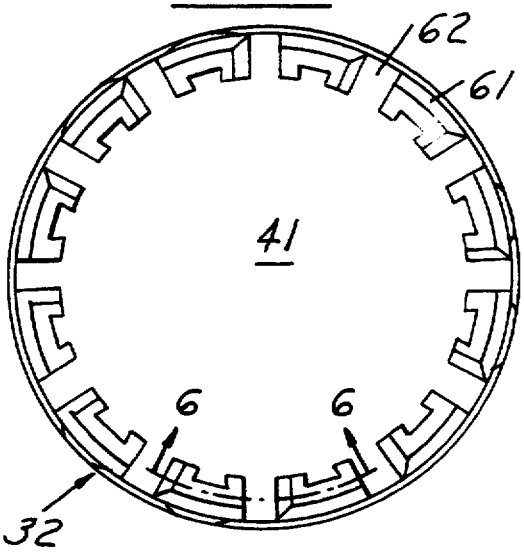
FIG. 5 is a top plan view taken along the line 5—5 in FIG. 3.
Figure 6:
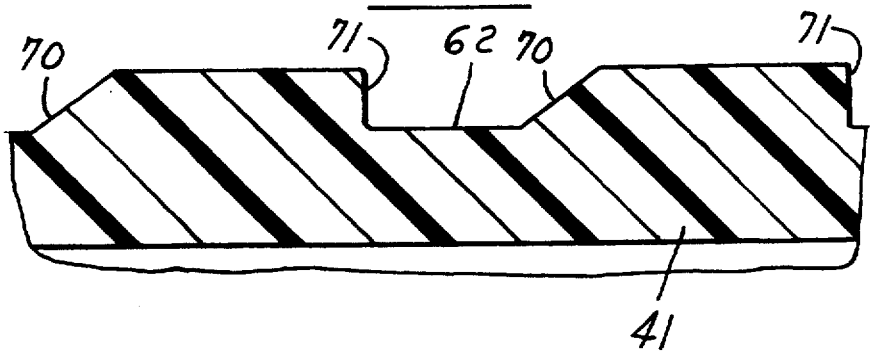
FIG. 6 is a fragmentary sectional view on an enlarged scale taken along the line 6—6 in FIG. 5.
Figure 7:
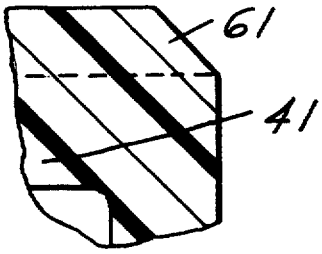
FIG. 7 is a fragmentary sectional view on an enlarged scale taken at line 7 in FIG. 3.
Figure 8:
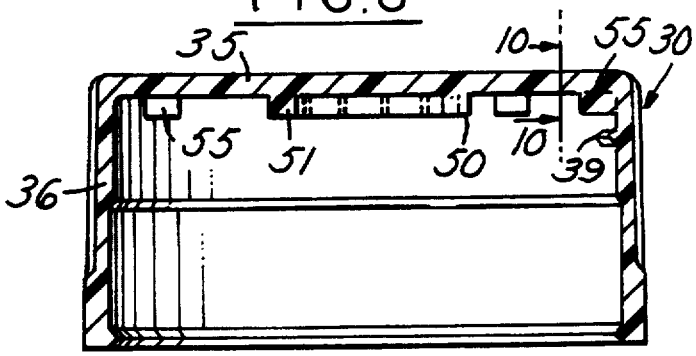
FIG. 8 is a sectional view or the outer closure member shown in FIG. 3.
Figure 10:
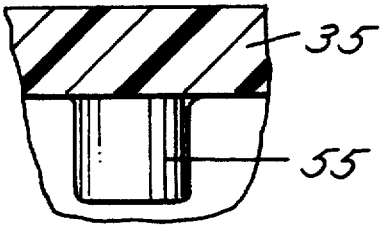
FIG. 10 is a fragmentary sectional view taken along the line 10—10 in FIG. 8.
Figure 15:
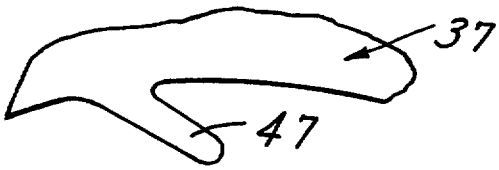
FIG. 15 is a fragmentary view on an enlarged scale taken along the line 15—15 in FIG. 14.
Figure 16:
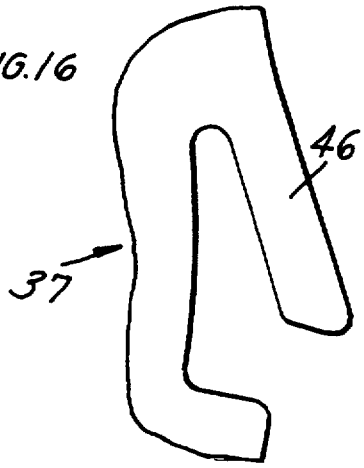
FIG. 16 is a fragmentary view on an enlarged scale taken along the line 16—16 in FIG. 14.

As shown in FIGS. 2–3, and 15 the outer closure member 31 comprises a base wall 35 and a peripheral skirt 36. An assembly of a day disk 37 and an indexing disk 38 is retained against axial movement but permissible rotatable movement with respect to the outer closure member 31 by an annular fiber 39 which engages an inclined surface 40 on the periphery of the indexing disk 38. The inner closure member 32 is of conventional child resistant construction as presently described and includes a base wall 41 and a peripheral skirt 42 having internal threads 43 that are adapted to engage threads 44 on the neck of the container 34. (FIG. 2).

Upon clockwise rotation of the outer closure member 31 combined with axial movement of the outer closure member 31 toward the inner closure member 32, the closure 30 is threaded ohio the container. During this rotation, the outer closure member 31 ratchets past the day disk 37 bringing the succeeding indicia 65 into view through the opening 66, as preferably described.

Figure 14:
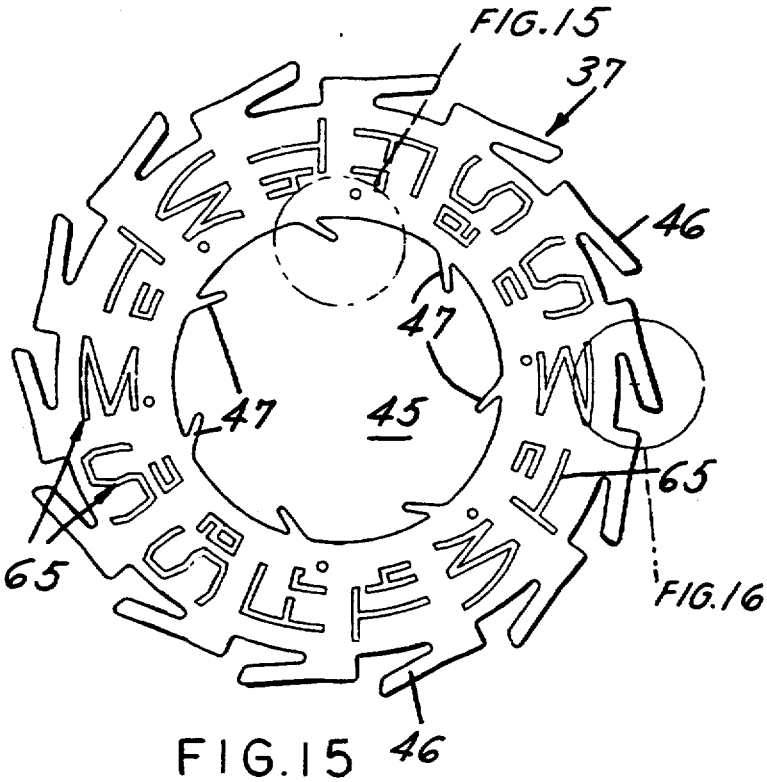
FIG. 14 is a plan view of an indexing ring.

The day disk 37 is reversible and indicia 65 can be provided on the opposite side as in FIG. 14. In such an arrangement, the rotation of the outer closure member 31 with respect to the day disk 37 occurs on application of the closure 30 to the container 34.

Figure 19:
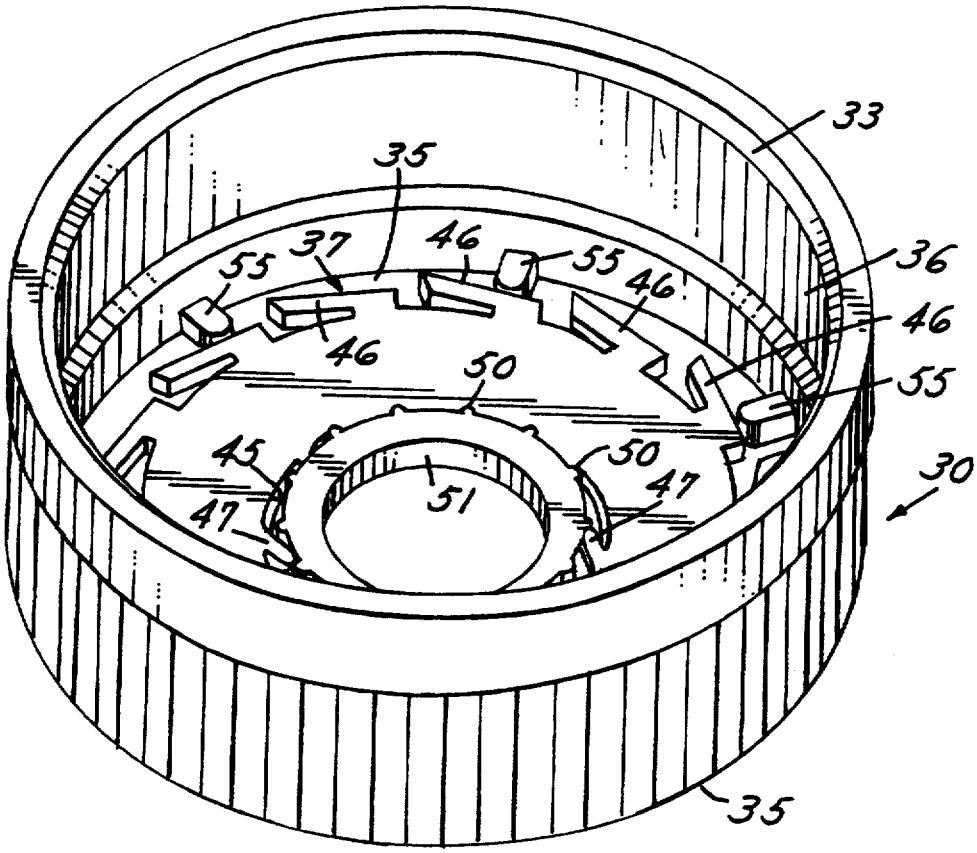
FIG. 19 is a bottom perspective view of the outer closure member with the indexing disk therein.
Figure 20:
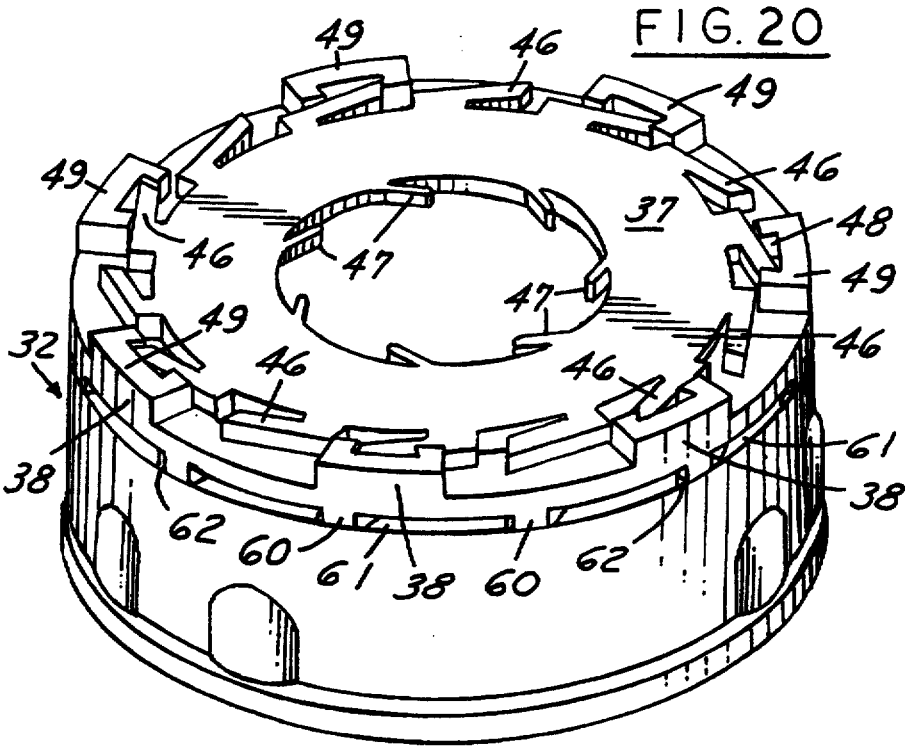
FIG. 20 is a top perspective view of the inner closure member with the indexing disk and locking disk thereon.

As shown in FIG. 14, the day disk 37 has an opening 45. A plurality of equally spaced flexible ratcheting fingers 46 are provided on the outer periphery thereof that radially extend clockwise as viewed in FIG. 14 and a plurality of equally spaced and ratcheting flexible fingers 47 on the inner periphery of the opening 45 therein which extend radially circumferentially in the same direction. Fingers 46 are adapted to move into recesses 48 on lugs 49 extending axially from the indexing disk 38 (FIG. 20). The flexible fingers 47 are adapted to engage axially extending radial ribs 50 on an annular wall 51 that is integral with and extends from the underside of the base wall 35 of the outer closure member 31 (FIG. 19).

Figure 9:
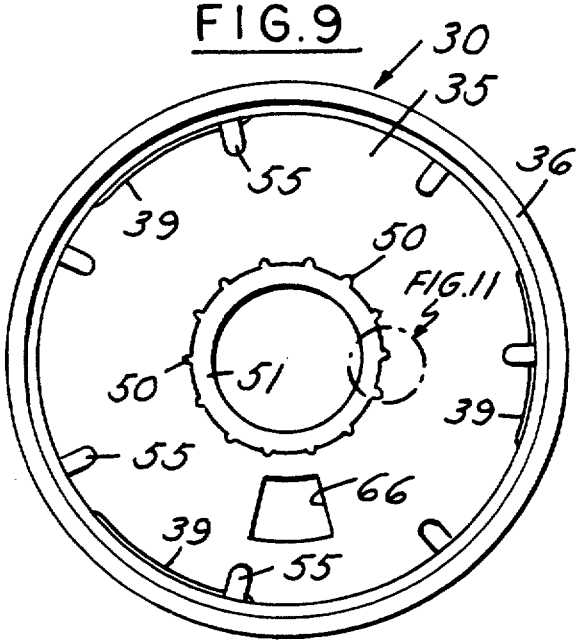
FIG. 9 is a bottom plan view of the outer closure member shown in FIG. 8.
Figure 11:
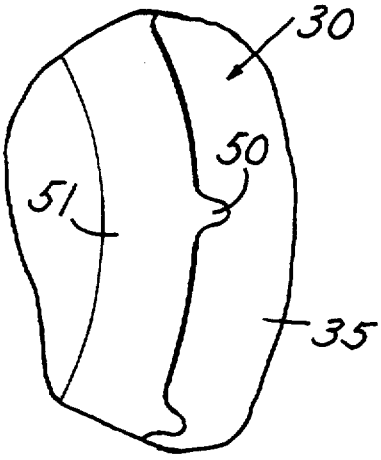
FIG. 11 is a fragmentary view on an enlarged scale taken along the line 11—11 in FIG. 10.
Figure 12:
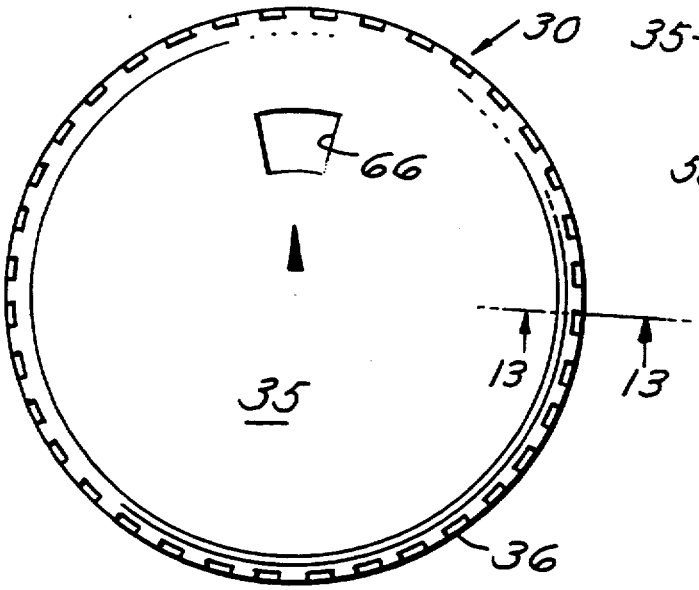
FIG. 12 is a top plan view of the outer closure shown in FIG. 8.
Figure 13:
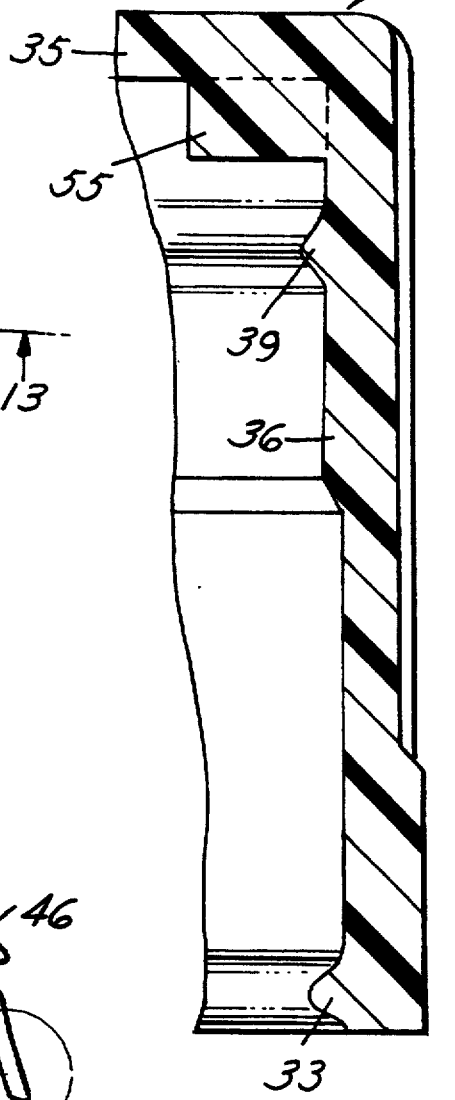
FIG. 13 is a fragmentary sectional view on an enlarged scale taken along the line 13—13 in FIG. 12.
Figure 17:
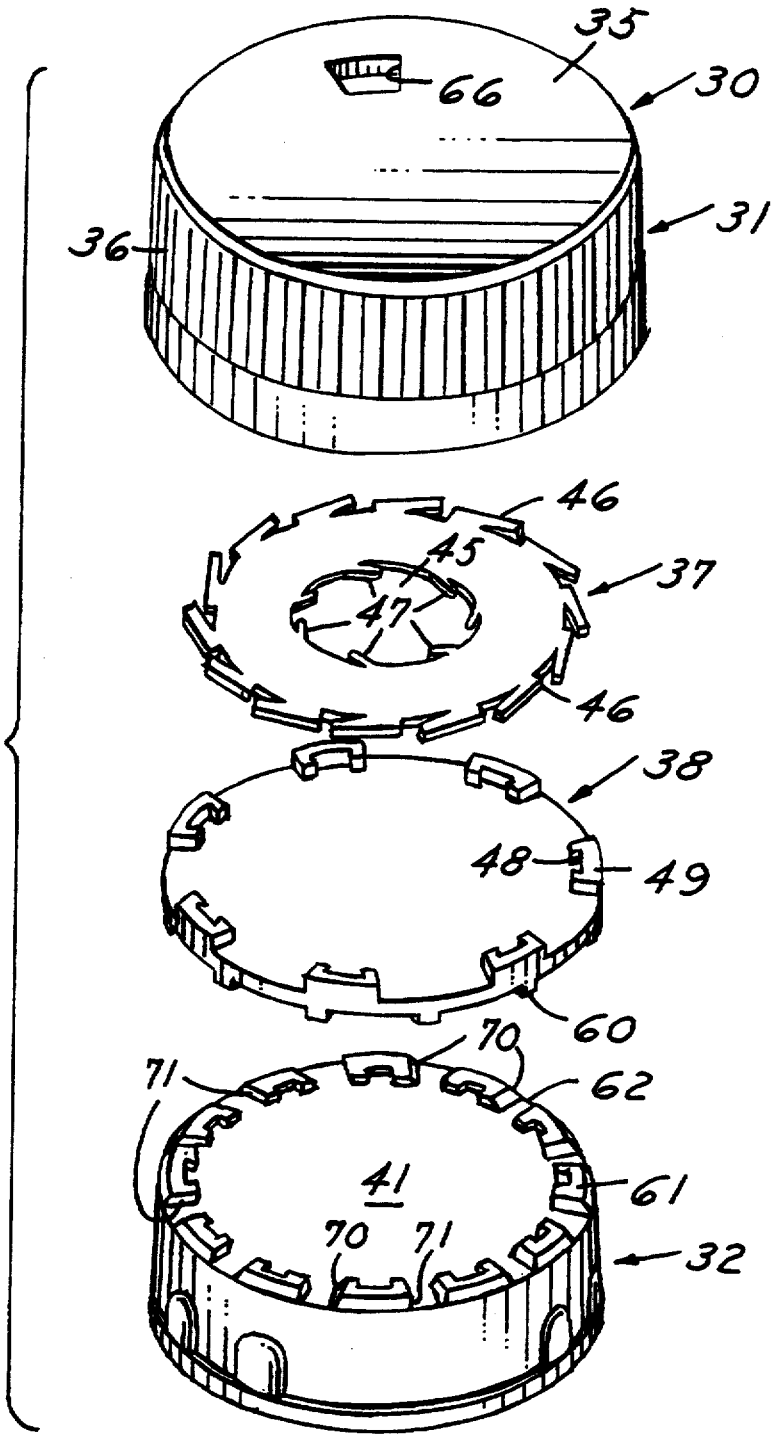
FIG. 17 is a top perspective exploded view of the closure embodying the invention.
Figure 18:
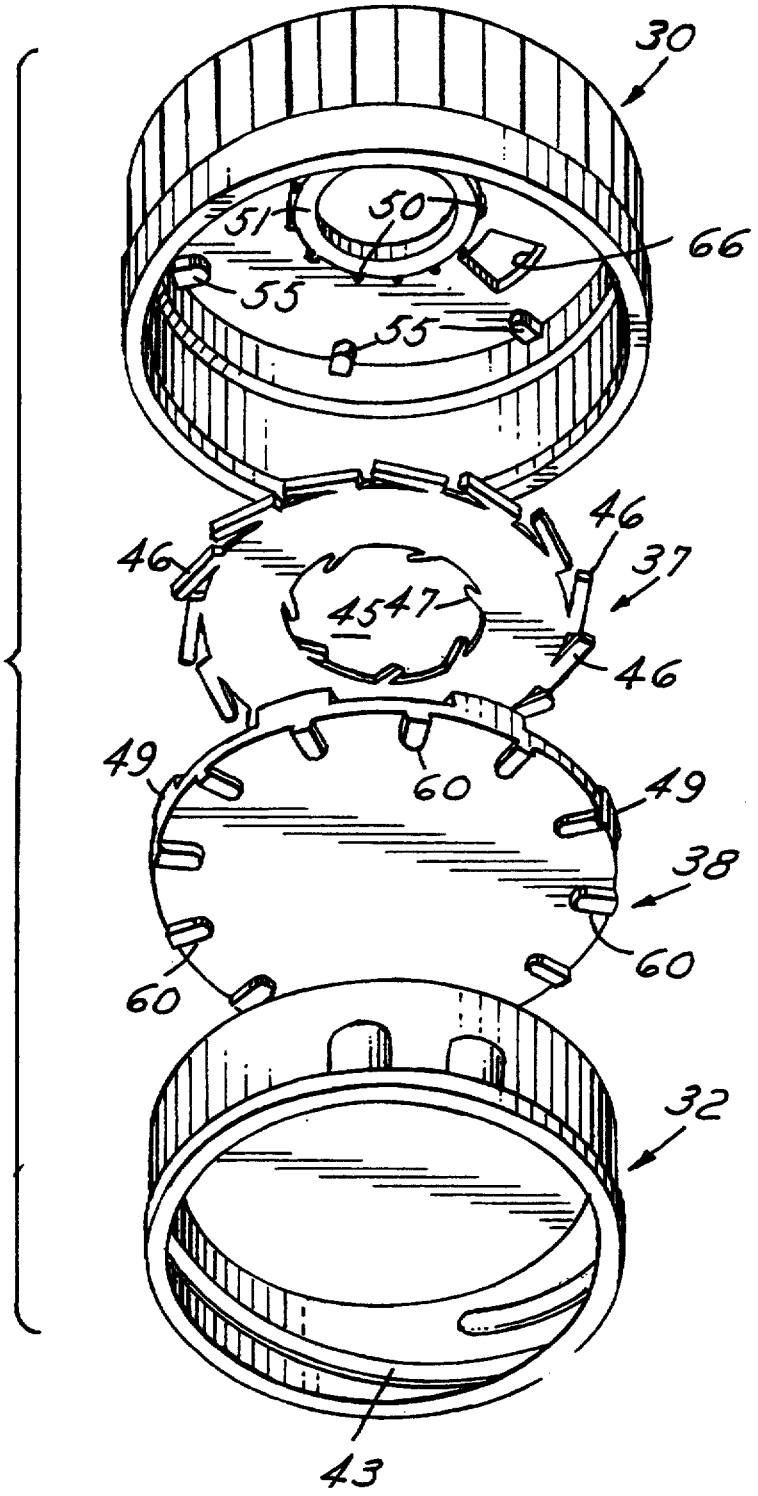
FIG. 18 is a bottom exploded perspective view of the closure.

As shown in FIG. 9, there are axially extending lugs 55 on the underside of the outer closure member 31. The lugs 55 are adapted to engage the lugs 49 on the indexing disk 38 when the closure 30 is rotated in either direction after a predetermined angle. Interengaging means comprising lugs 60 on the underside of the indexing disk 38 extend into spaces 62 between lugs 61 on the inner closure member 32 (FIG. 17). Upon axial movement of the outer closure member 31 relative to the inner closure member 32 and counterclockwise rotation of the outer closure member 31, engagement is provided between the lugs 60, 61 for unthreading the closure 30 from the container.

The day disk 37 includes indicia 65 for time, such as the days of the week or as shown in FIG. 14, for two sets of days of the week. The outer closure member 31 is provided with an opening 66 through which each of the indicia 65 may be viewed. The indicia 65 are either embossed, debossed or printed. Upon clockwise rotation of the outer closure member 30 in a direction to apply the inner closure member 32, the abutments 50 deflect on depending ring Sl and rotate past the flexible elements 47 on the inner surface of the day disk 37.

The closure components are preferably made of plastic such as polypropylene or polyethylene and the day disk 37 preferably has a different color from the outer closure member 31.

The closure 30 is applied to the container 34 by rotating the closure onto the threads of the container in at clockwise direction. Continued rotation, in a clockwise direction as viewed from above tightens the threads. Rotation of the outer closure member 31 in a counterclockwise direction will normally merely cause the outer closure member to rotate relative to the inner closure member 32. In order to remove the closure 30 from the container, it is necessary to move the outer closure member 31 axially toward the inner closure member 32 bringing the lugs 60 on the indexing disk 38 and into the spaces 62 between the lugs 61 on the inner closure member 32 recesses whereby upon continued downward force and counterclockwise rotation of the outer closure member 31 the inner closure member 32 is unthreaded from the container. During this rotation, and before the lugs 55 engage the lugs 49, the fingers 47 engage the ribs 50 to rotate the day disk 37 with the outer closure member.

Referring to FIG. 2 and 3, segmented bead 39 on skirt 36 of the ouler closure member 31 is positioned a specific distance from the top panel 35 such that indexing disk 38 and day disk 37 are retained within the upper region or outer closure member 31. There is sufficient axial distance between the segmented bead 39 and the top panel 35 of the outer closure member 31 that little or no axial dimensional interference exists between the outer closure member 31, the indexing disk 38 or the day disk 37. The outer closure member 31, the indexing disk 38 or the day disk 37 are free to rotate relative to each other but there is very limited axial movement between these parts because of segmented retaining bead 39. The axial height or thickness of the day disk 37 is less than the axial height of lugs 49 on indexing disk 38 and the lugs 55 on the outer closure member. This arrangement allows the outer closure member 31 and indexing disk 38 to operate in unison with regard to any axial movement of the outer closure 31. As a result, the axial forces on the outer closure do not interfere with the rotation of the reminder components. Furthermore, the axial forces do not cause wear and obliteration of the indicia.

Closure Removal

To remove closure 30 from container 34, the outer closure member 31 must be rotated counterclockwise which causes the lugs 55 on the top panel 35 of outer closure member 31 to contact the sides of projections 49 on indexing disk 38 causing it to rotate in a counterclockwise direction. The lugs 60 on indexing disk 38 now contact the lugs 61 on the base wall 41 of inner closure member 32 and will cam up the inclined surface 70 of the succeeding projection 61 unless sufficient axial force is applied to prevent the lugs 60 from camming up this inclined surface. When sufficient downward force is exerted the lugs 60 will impart rotational torque onto the inner closure 32 and cause it to unscrew from the container 34. The construction of such a child resistant feature is like that of U.S. Pat. No. 4,997,096, incorporated herein by reference. Other well known child resistant constructions may also be used such as shown in U.S. Pat. Nos. 4,353,474, 4,371,088, 4,480,759, 4,609,114, 4,957,210, 5,020,681 and U.K. 1,529,999, incorporated herein by reference, each of which functions with relative axial movement and torque between an outer closure member and an inner closure member.

Closure Application and Tightening

When the closure 30 is applied to the container 34 the outer closure member 31 is rotated in a clockwise direction causing the lugs 55 on its top panel to contact projections 49 on the base wall of the indexing disk 38 causing the indexing disk [30] *38* to rotate in a clockwise direction bringing lugs 60 on its bottom panel into contact with sides 71 of lugs 61 on the top panel 41 or inner closure 32 causing it to turn in a clockwise direction. Continued rotation of outer closure member 31 will cause the inner closure 32 to become tightened into container 34.

During the removal of the closure 30 from the container 34 rotation of the outer closure 31 causes ribs 50 on the ring 51 depending from top panel 35 to contact flexible projections 47 on the day disk 37 causing the day disk to also rotate in the removal direction (counterclockwise). This rotation or the day disk 37 causes the flexible projections 46 to rotate out of indexing pockets 48 in projections 49 on the indexing disk 38. This rotation of the outer closure 31 and day disk 37 with respect to indexing disk 38 continues until lugs 55 on the base wall 35 of outer closure member 31 come into contact with projections 49 on the indexing disk 38. The total angular rotation of the outer closure member 31 and day disk 37 with respect to the indexing disk 38 will have advanced the day disk one indexing position with respect to the indexing disk [37]" *38* and the day disk [38 ] *37* will have remained stationary with respect to the outer closure 31. Therefore, the indicia on the day disk 37 viewed through window 66 on the outer closure 31 did not change during this counterclockwise rotation of the outer closure member 31.

When the closure 30 is applied to the container and the outer closure 31 is rotated in the clockwise direction, the day disk 37 remains stationary with respect to the indexing disk 38 because the flexible projections 46 are locked into the pockets 48 on projections 49 on the indexing disk, while ribs 50 on ring 51 on the outer closure 32 rotate past flexible projections 47 on the interior of day disk 37. This rotation continues until lugs 55 on the top panel of the outer 31 contact projections 49 on the indexing disk. This entire rotation will have advanced the day disk 31 one indexing position with respect to the outer closure and indicia [on] *in* the window 66 of the outer 31 will have been advanced one position.

During application and removal of the closure 30 from the container 34 the angular motion of the lugs on the outer closure moves through a predetermined angle as they contact the projections 49 on the indexing disk 38. For example, if there are 14 indexing positions, then are divides 360° by 14, or 25.7. Therefore, the indicia should appear on the day disk 37 at 25.7° intervals and the outer should rotate minimum of 25.7° each time a change in rotational direction takes place, for the closure 30 is to advance one indexing position each time the closure 30 is rotated in the clockwise direction as is being applied to the container 34.

It can thus be seen that there has been provided a child resistant closure which is reliable; which functions to repeatedly provide the desired information; which do not incorporate axial forces between the reminder components; wherein the components are reversible so that the change in visible indicia can be made either as application or removal of the closure; which utilizes old and well known child resistant construction; and which can be manufactured readily in high-production.

I claim:

1. A child resistant reminder closure comprising an outer closure member having a base wall and a peripheral skirt, an inner closure member having a base wall and a peripheral skirt, interengaging means between the outer closure member and inner closure member to retain the inner closure member against axially outward movement relative to the outer closure member, said outer closure member and said inner closure member having limited axial movement [to one another] *relative to each other,* an assembly of a day disk and an indexing disk being rotatably mounted on said outer closure member, said day disk being provided adjacent the inner surface of the base wall of the outer closure member, said indexing disk being provided adjacent said day disk, said day disk having an opening and a first set of flexible radial ratcheting means extending radially inwardly into the opening from said day disk and a second set of flexible radial ratcheting means extending radially from the day disk in the same *circumferential* direction as the first set, said outer closure member having a *first* set of lugs adapted to engage said first set of flexible *radial* ratcheting means *such that there is permissible rotational movement of the day disk relative to the outer closure in one circumferential direction,*

[said outer closure member having another set of lugs adapted to engage said second set of flexible ratcheting means,]

said indexing disk having [means thereon] *a second set of lugs on the top surface* engageable by said [first] *second* set of *flexible* ratcheting means on said day disk *such that there is permissible rotational movement of the day disk relative to the indexing disk in the opposite circumferential direction from that of permissible rotational movement of the day disk relative to the outer closure member,* a [first] set of [axially] *rotationally* interengageable means between said outer closure member and said indexing disk *which are engaged when the outer closure member is rotated through a predetermined angle in either direction,* a [second] set of axially interengageable *child resistant* means between said indexing disk and said inner closure member, said day disk having circumferentially spaced indicia thereon, said base wall of said outer closure member having an opening adapted to be selectively aligned with said indicia, interengaging means on the inner closure member adapted to engage means on a container by relative rotation of said inner closure member and a container, such that when the outer closure member is moved axially [to engage] *toward* the inner closure member [,] *and the outer closure member is rotated, the axially interengageable child resistant means between said indexing disk and said inner closure member become engaged and* the closure can be removed *or applied* from [a] *the* container *by rotation of the outer closure member* and *such that* said day disk can be rotated relative to said outer closure member during either said application or said removal of said disk to bring different indicia into view through said opening.

2. The child resistant reminder closure set forth in claim 1 wherein said first set of flexible radial ratcheting means on said day disk comprise flexible fingers extending circumferentially in one direction and having free ends, said second of said set of flexible radial ratcheting means comprising a plurality of circumferentially extending flexible fingers extending circumferentially in the same direction as the first set of fingers [and] *, said*

*first set being* positioned on [and] *the* opening in said day disk.

3. The child resistant reminder closure set forth in claim 2 wherein [one] said *set of rotationally interengageable means between said outer closure member and said indexing disk comprises a third* set of [said] lugs on said outer closure member [is] positioned at the juncture of the base wall and peripheral skirt of said outer closure member [the other set of lugs is] said set of lugs is, *said first set of lugs on said closure member engaging said first set of flexible fingers being* positioned on the periphery of a cylindrical surface extending downwardly from the base wall of said outer closure member.

4. The child resistant reminder closure set forth in claim 3 wherein said means on said indexing disk engageable with the [first] *second* set of flexible fingers on said day disk comprise lugs on said indexing disk extending toward said base wall of said outer closure and having, recesses therein engaging the free ends of the [first] *second* set of flexible fingers comprising the first set of ratcheting means. [, said one set of lugs on said outer closure member being adapted to engage said lugs on said indexing ring when the outer closure member is rotated in either direction.]

5. The child resistant reminder closure set forth in claim 4 wherein said [second] set of axially interengageable *child resistant* means between said indexing disk and said inner closure member comprises a fourth set of lugs on the underside of said indexing disk and a *and a fifth set of* circumferentially *spaced* lugs on the top surface of said base wall of said inner closure member, said *fourth set of* lugs on the underside of the indexing disk being adapted to extend between the recesses of said *fifth set of* lugs on the inner closure member when the outer closure member is moved axially toward the inner closure member and to engage the fourth set of lugs on the inner closure member when the outer closure member is rotated to apply or remove the closure from a container.

6. The child resistant reminder closure set forth is any one of claims 1–5 wherein said flexible ratcheting means on said day disk extend circumferentially such that said day disk is rotated relative to said outer closure member on removal of the closure.

7. The child resistant reminder closure set forth in any one of claims 1–5 wherein said flexible ratcheting means on said day disk extend circumferentially such that said day disk is rotated relative to said outer closure member on application of the closure.

8. The child resistant reminder closure set forth in any one of claims 4–7 wherein the thickness of the day disk in an axial direction is less than the axial height of [the] *said second set of* lugs on the indexing disk which extends toward the outer closure member and less than the axial height of [the] *said third set of* lugs [on] *located at the juncture of the base wall and skirt of* the outer closure member.

9. The child resistant reminder closure set forth in claim 1 comprising means on said outer closure member for holding said assembly of said day disk and indexing disk against axially outward movement relative to said outer closure member.

* * * * *